United States Patent [19]

Lamarche

[11] Patent Number: 4,533,032
[45] Date of Patent: Aug. 6, 1985

[54] FRICTION ENGAGING DRIVES WITH CERAMIC MATERIALS

[75] Inventor: Paul E. Lamarche, Utica, Mich.

[73] Assignee: Borg-Warner Corporation, Chicago, Ill.

[21] Appl. No.: 443,839

[22] Filed: Nov. 22, 1982

[51] Int. Cl.³ .............................................. F16D 11/00
[52] U.S. Cl. ........................ 192/107 M; 192/107 R; 188/218 XL; 188/73.2
[58] Field of Search ............... 192/107 M, 107 R, 52, 192/70.14; 188/218 XL, 251 A, 71.8, 73.2

[56] References Cited

U.S. PATENT DOCUMENTS

| | | | |
|---|---|---|---|
| 1,654,911 | 1/1928 | Bartholomew | 192/70.2 |
| 2,581,637 | 1/1952 | Danly et al. | 192/107 R |
| 2,835,367 | 5/1958 | Steck | 192/107 |
| 2,888,122 | 5/1959 | Garmager | 192/107 |
| 2,908,368 | 10/1959 | Granke et al. | 192/107 |
| 2,916,123 | 12/1959 | Garmager | 192/107 |
| 2,986,252 | 5/1961 | Du Bois | 192/107 |
| 3,034,365 | 5/1962 | Stieber | 188/73.2 |
| 3,064,782 | 11/1962 | Du Bois | 192/107 |
| 3,209,876 | 10/1965 | Kraft | 192/107 |
| 3,610,383 | 10/1971 | Rosteo | 192/107 R |
| 3,734,256 | 5/1973 | Compton et al. | 188/218 XL |

FOREIGN PATENT DOCUMENTS 2106290  2/1971  Fed. Rep. of Germany .

Primary Examiner—Allan D. Herrmann
Assistant Examiner—Shirish Desai
Attorney, Agent, or Firm—James A. Geppert

[57] ABSTRACT

A friction energizing drive such as a clutch disc in a friction clutch for automotive clutches, starting clutches for continuously variable transmissions and heavy-duty clutches for heavy equipment or off-the-road vehicles, wherein a ceramic material in the form of discs or buttons comprise the friction material. To smooth the generally abrupt torque curve and reduce the harsh feel of a ceramic material clutch, the ceramic material in the form of circular members, alone or secured to disc backings, are rotatably mounted on an annular clutch disc or plate located between a flywheel and pressure plate in a clutch assembly.

10 Claims, 9 Drawing Figures

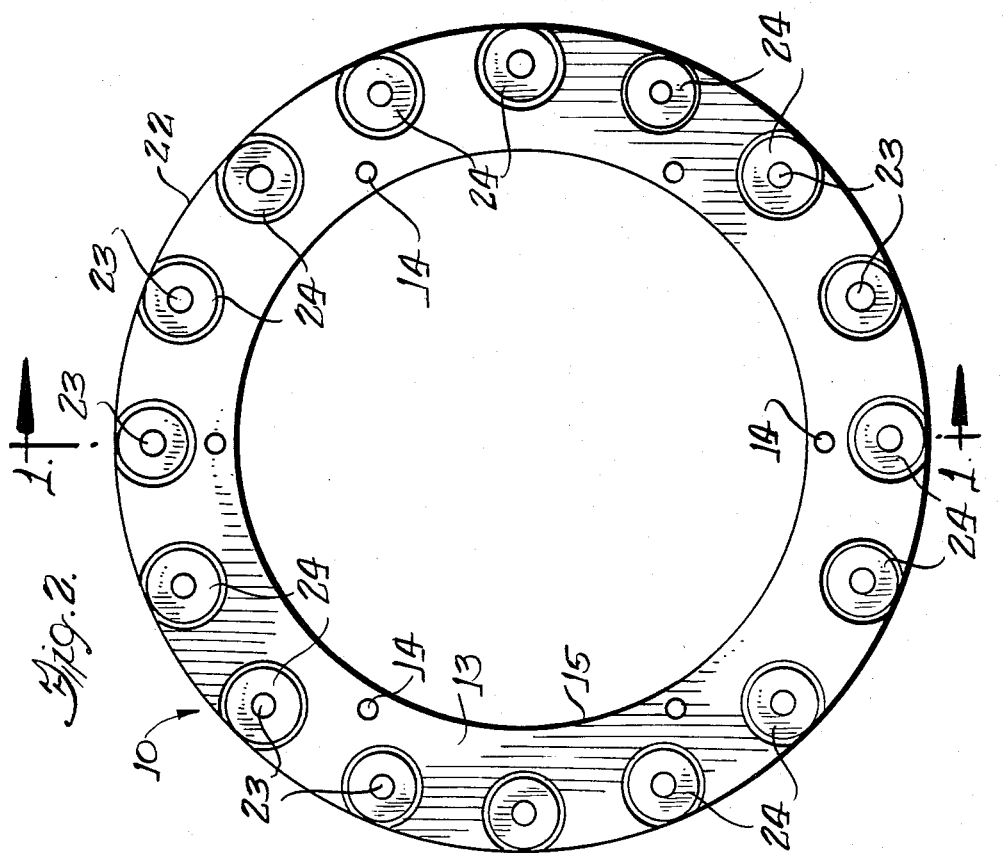
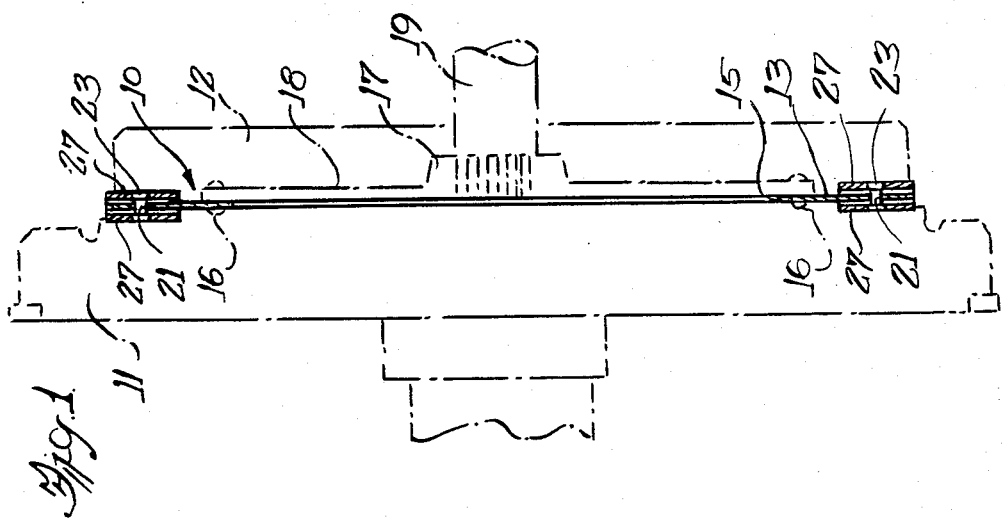

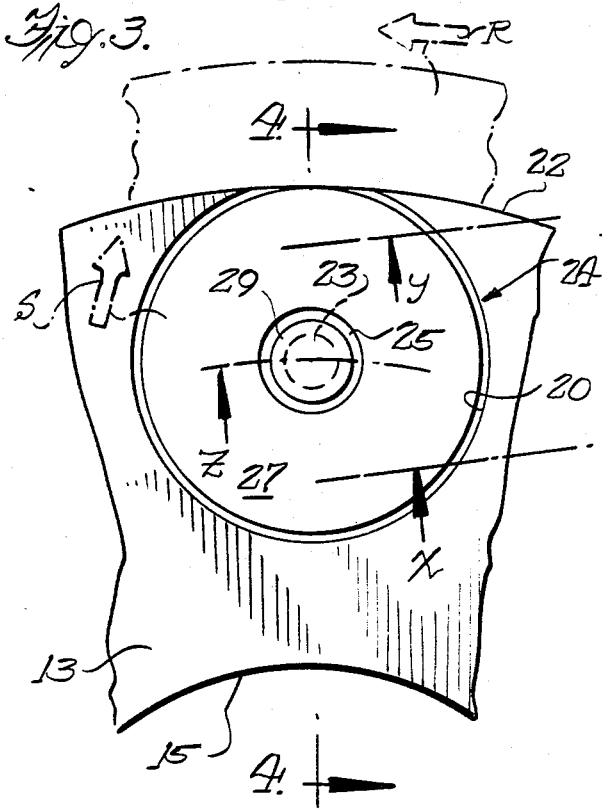
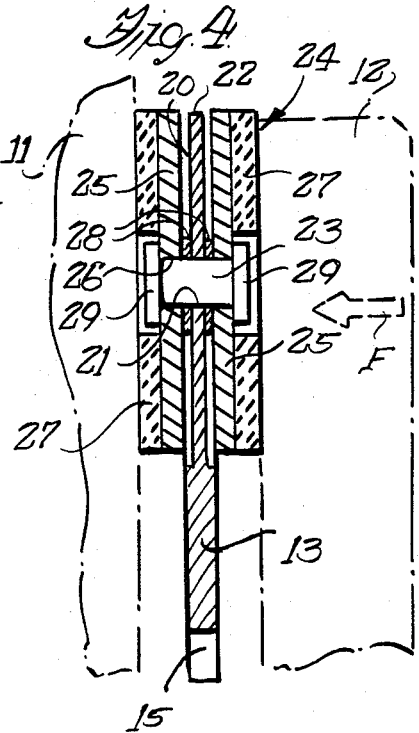
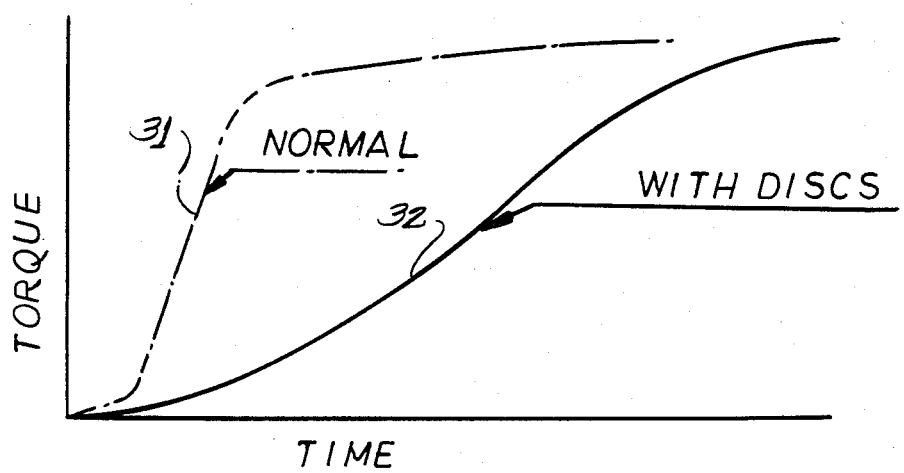

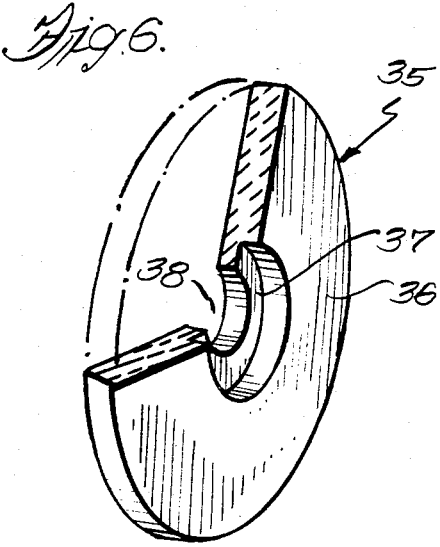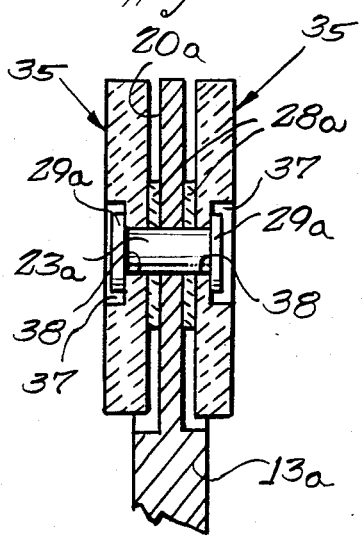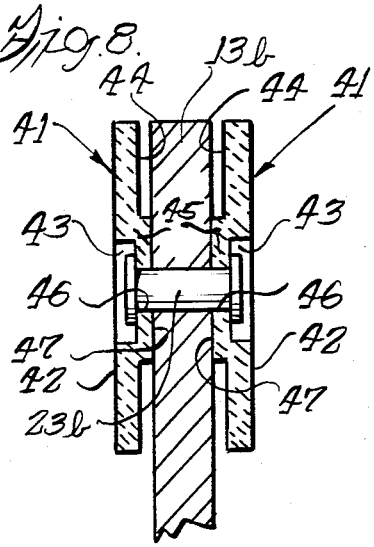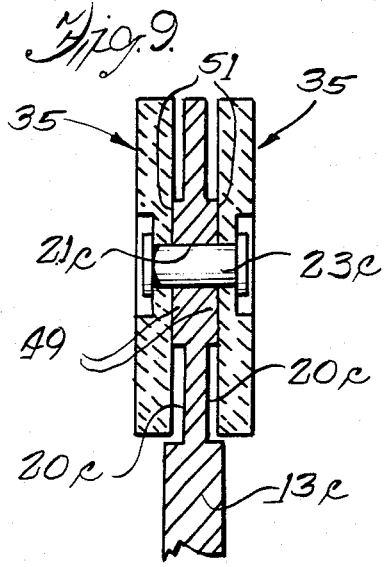

FRICTION ENGAGING DRIVES WITH CERAMIC MATERIALS

BACKGROUND OF THE INVENTION

Ceramic materials have been utilized as friction materials for clutches for many years. In general, ceramic or cerametallic materials or sintered powdered metals are utilized in the form of discs or buttons that are uniformly distributed on a clutch base plate or other supporting element. As the material is brittle and easily fracturable, the discs or buttons are located in and supported by a metallic cup having a base adapted to be secured to the supporting element with a side wall that is initially generally cylindrical, but can be inwardly deformed to interlock with the outer edge of the disc or button to retain it in the cup. Also, the cup is secured to the supporting member to prevent rotation, or the cup has one or more projections or rivets which interact with the supporting element to prevent rotation of the friction button during use in the clutch.

The use of ceramic or cerametallic friction materials is normally designated primarily for heavy service conditions causing high operating temperatures. Under some types of heavy service, these materials are unsatisfactory due to excessive wear of the material or a tendency to score the cast iron surfaces of the flywheel and pressure plate engaged thereby. Also, smooth operation of the device in which the clutch is installed is difficult as the operator does not have the ability to control the engagement of the clutch to the requisite degree. As the material is relatively hard and offers no resiliency, the clutch is therefore either engaged or disengaged without the gradual frictional engagement found in other conventional clutch friction materials. Thus, it is substantially impossible to control the degree of smoothness of clutch engagement required for desired maneuverability.

As considerable heat is generated in service, there is a tendency for the flywheel and pressure plate surfaces to dish concavely towards each other, which will alter the loading on the friction buttons and cause uneven wear. To overcome these disadvantages, the friction buttons have been mounted on the supporting element in a manner to provide a limited degree of resilience when the buttons are engaged by the flywheel and pressure plate. However, the resilient mounting does not overcome the problem of the clutch grabbing upon engagement thereof resulting in an abrupt torque curve. The present invention overcomes the above noted problems to provide a gradual torque curve for a ceramic friction material clutch and reduce the poor or harsh feel for the operator.

SUMMARY OF THE INVENTION

The present invention comprehends the provision of a novel clutch plate structure employing ceramic, cerametallic or sintered powdered metal friction material which results in a smooth torque curve for clutch engagement instead of a sharp grabbing action. The ceramic material is in the form of annular or doughnut shaped friction rings adhesively secured on backing discs or ceramic buttons which are uniformly distributed on both surfaces of an annular clutch plate. The friction rings or buttons are axially aligned on the opposite clutch plate surfaces and are mounted to be rotatable relative to the clutch plate.

The present invention also comprehends the provision of a novel clutch plate structure having a plurality of circumferentially equally spaced ceramic friction rings or buttons rotatably mounted on the opposite surfaces of the clutch plate. A rivet or axle extends through an opening in the clutch plate and through central openings in the backing discs for the friction rings or in the buttons and is headed to retain the discs on the clutch plate. Annular bearings may be mounted on the rivet or axle and located between the backing discs or buttons and clutch plate so the friction members are capable of rotation relative to the clutch plate.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a cross-sectional view of the clutch plate with the friction rings or buttons thereon taken on the line 1—1 of FIG. 2.

FIG. 2 is a rear elevational view of the clutch plate.

FIG. 3 is an enlarged partial rear elevational view of one form of friction button on the clutch plate.

FIG. 4 is a cross-sectional view of the friction button taken on the line 4—4 of FIG. 3.

FIG. 5 is a graphic representation of the torque curves for a conventional friction button clutch and the friction button plate of the present invention.

FIG. 6 is a perspective view, partially broken away, of a one-piece ceramic friction button.

FIG. 7 is a cross-sectional view, similar to FIG. 4 of the friction button of FIG. 6 mounted on a support plate.

FIG. 8 is a cross-sectional view of a third embodiment of friction button on a support plate.

FIG. 9 is a cross-sectional view of the friction button of FIG. 6 in an alternate plate mounting.

DESCRIPTION OF THE PREFERRED EMBODIMENT

Referring more particularly to the disclosure in the drawings wherein are shown illustrative embodiments of the present invention, FIGS. 1, 2, 3 and 4 disclose a friction clutch plate 10 of the present invention which is positioned between a flywheel 11 and a pressure plate 12 of a clutch assembly in the drive line between the engine and transmission of an automotive vehicle. The clutch plate 10 includes an annular plate 13 carrying the friction material and having openings 14 adjacent the inner periphery 15 for rivets 16 to secure the ring to the flange 18 of a clutch hub 17 mounted on the splined end of a transmission input shaft 19. If desirable, a vibration damper assembly (not shown) can be incorporated between the annular plate and the clutch hub flange.

The annular plate 13 includes a plurality of circumferentially equally spaced circular recesses 20 having central openings 21 located adjacent the outer periphery 22 of the plate 13, the openings 21 receiving rivets or axles 23 for ceramic friction buttons 24. Each button includes a metal disc or backing member 25 having a central opening 26 encompassing the axle 23, and an annular friction ring 27 formed of a compressed ceramic or cerametallic material, which may contain suitable binders and fillers or may be sintered where metallic particles are combined with the ceramic material, is adhesively joined to the disc 25. A bearing 28 encompassing the axle 23 is located between the annular ring 13 and the backing disc 25 within the recess 20 to provide for rotation of the disc and friction ring relative to the clutch plate 13. The axle 23 is headed at 29 beyond each backing disc 25 to secure the friction button assembly onto each surface of the plate 13.

Considering FIGS. 3 and 4, the radius of the friction button from the central axis of the plate is denoted as z, the radius to a median point on the inner half of the button is x, and the radius to a median point on the outer half of the button is y. The force is applied in the direction of arrow F for engagement of the clutch, and rotation of the flywheel and pressure plate is in the direction of arrow R. As the force is applied in direction F, the force vector y is always greater than the force vector x. Thus, as the pressure plate and flywheel begin to engage the friction buttons, the vector y being greater than vector x results in a rotation of the button in the direction of arrow S. The full engagement of the clutch is delayed as a result of rotation of the buttons, which also results in a smoothing out of the engaging characteristics of the clutch until the force F is equal at y and x.

Thus, from FIG. 5, the dotted line curve 31 is a typical torque curve for a ceramic or other temperature and coefficient sensitive material used as a clutch friction surface where the clutch surfaces are substantially immediately grabbed to provide an abrupt clutch engagement. However, the smoother solid line curve 32 represents the torque curve for a ceramic or cerametallic friction material utilized in the present invention as previously described, which curve provides an improved clutch feel to the vehicle operator and a smoother application of the clutch during operation. Although described for use as a vehicle clutch, the present invention would also be useful for starting clutches for continuously variable transmissions or for heavy equipment and/or heavy-duty vehicle clutches.

FIG. 6 discloses an alternate form of friction button 35 which is a one-piece ceramic button having a central recess 37 in one surface 36 with a central opening 38 extending through the recessed area. As seen in FIG. 7, this button is mounted in a recess 20a formed in clutch plate 13a with the axle 23a extending through the opening 38 and having the headed end 29a located in the recess 37. Also, a bearing 28a encompassing the axle 23a is positioned in the recess 20a between the plate 13a and the button. Although this button and the button 24 of FIGS. 3 and 4 are utilized with a recess in the plate 13 or 13a, if the thickness of the clutch assembly was not limiting, either button could be mounted with its associated bearing on a flat plate.

FIG. 8 discloses a third embodiment of friction button 41 utilized with a flat clutch plate 13b and without a bearing. The ceramic button is one-piece with a central recess 43 in one surface 42 and a raised circular central projection 45 on the opposite surface 44; a central opening 46 being centered in the recess 43 and extending through the projection 45 to receive an axle 23b. The projection 45 facing the clutch plate 13b acts as the reduced area bearing surface 47 for rotation of the button during clutch engagement. Also, this friction button 41 can be used with a clutch plate having a recess accommodating the button, such as shown in FIGS. 3 and 4.

FIG. 9 discloses an alternate embodiment for clutch plate 13c having a recess 20c for the friction button 35 shown in FIG. 6, although the buttons 24 and 41 could also be utilized. To provide a reduced area bearing surface 51, a circular projection 49 is centrally formed in the recess with a central opening 21c therethrough to receive the axle 23c securing the button to the clutch plate and providing the axis for rotation of the button.

I claim:

1. A clutch driven plate comprising an annular clutch plate operatively connected to a clutch hub on a transmission input shaft, a plurality of annular temperature and/or coefficient of friction sensitive friction buttons formed from a ceramic, cerametallic or sintered metal powder, and means to rotatably mount the buttons on the annular plate adjacent its periphery to smooth the harsh feel of clutch engagement of the buttons with a flywheel and pressure plate, said rotatable mounting means comprising a plurality of openings in said clutch plate, an axle received in each opening, each friction button having a central opening therein receiving an end of the axle, the opposite ends of the axle being headed to retain the friction buttons on the clutch plate, and reduced diameter bearing means between each friction button and the clutch plate.

2. A clutch driven plate as set forth in claim 1, wherein said bearing means comprises a flat bearing encompassing each axle and positioned between each friction button and the clutch plate.

3. A clutch driven plate as set forth in claim 1, wherein a circular recess is formed in said clutch plate accommodating a friction button.

4. A clutch driven plate as set forth in claim 3, in which said bearing means comprises a central projection of a lesser diameter than said friction button formed in said recess to abut said button.

5. A clutch driven plate as set forth in claim 1, in which said friction buttons comprise a backing disc with an annular friction ring secured thereto.

6. A clutch driven plate as set forth in claim 5, in which said backing disc has a central opening receiving said axle, and said friction ring provides a central recess for the headed end of the axle.

7. A clutch driven plate as set forth in claim 1, in which said friction button is a one-piece friction member having a central recess formed in one surface with a central opening therein.

8. A clutch driven plate as set forth in claim 7, in which said bearing means comprises a circular projection formed on the button surface opposite to said recess, said opening extending centrally through said projection.

9. A clutch driven plate as set forth in claim 1, in which the periphery of each friction button generally coincides with the periphery of the clutch plate.

10. A clutch driven plate as set forth in claim 1, in which the vector from the axis of the clutch plate to a portion of said friction button beyond said axle is greater than the vector to a portion of said friction button short of the axle resulting in rotation of said friction button as force is applied normal to the button until the force is equal for both vectors.

* * * * *